June 6, 1939.   L. L. DOLLINGER   2,161,027
FAN
Filed April 14, 1936   2 Sheets-Sheet 1

INVENTOR
LEWIS L. DOLLINGER
BY
*Eric Schnger* ATTORNEY

June 6, 1939.  L. L. DOLLINGER  2,161,027
FAN
Filed April 14, 1936  2 Sheets-Sheet 2

INVENTOR
Lewis L. Dollinger
BY
ATTORNEY

Patented June 6, 1939

2,161,027

UNITED STATES PATENT OFFICE 2,161,027

FAN

Lewis L. Dollinger, Rochester, N. Y., assignor to Staynew Filter Corporation, Rochester, N. Y.

Application April 14, 1936, Serial No. 74,308

2 Claims. (Cl. 230—232)

This invention relates to an air filtering and conditioning mechanism and has for one of its objects to so combine a fan with an air filter that all air brought in circulation with the fan is efficiently filtered thereby.

A further object of this invention is to so combine a fan with an air filter that the filter will absorb practically all of the fan noises.

Another object of this invention is to provide a fan with combined filter and noise silencing means to make the operation of the fan substantially noiseless.

All these and other objects and attendant advantages of this invention will become more readily apparent from the detailed description of several embodiments thereof, reference being had to the accompanying drawings in which Figure 1 is a side elevation of a fan equipped with a filter in accordance with my invention, the filter being illustrated in section.

In the several figures of the drawings like reference numerals indicate like parts.

Electric fans used for circulating air in rooms for cooling purposes cause dust to be picked up by the air currents so that the fan will constantly circulate dust laden air thru the room. Thus, while the air currents created by the fan have a cooling effect, this cooling effect is produced at the expense of loading the air with dust particles. The use of fans has been found very objectionable for this reason and also because of the fan noises created by them in their operation.

Both of these objectionable features in the use of a fan have been eliminated by my present invention which combines the fan with a filter in such a manner that it not only filters the air which it delivers, but also reduces the noise created by the fan in delivering the air. In addition thereto the outlet for the discharge of the filtered air is so constructed and arranged in combination with the fan and filter that it further silences the fan noises and makes the use of the combined fan and filter substantially noiseless.

Figure 1:
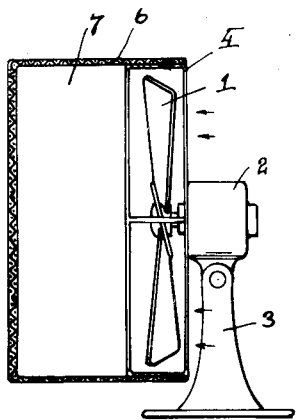

In the embodiment of my invention illustrated in Figure 1 the fan 1 is driven by the motor 2 which is supported on the standard 3 and may or may not be mounted to oscillate thereon. The fan is surrounded by the fixed guard cage 4 and on this cage is supported a filtering unit. This unit comprises a suitable perforate housing 6, one end of which surrounds the periphery of the cage 4 and is suitably fastened thereto. The perforate housing extends from the cage 4 and is covered at the forward end and around the side walls with a suitable air filtering material such as felt or other fibrous material so as to provide a large air chamber 7 in front or the delivery side of the fan. The side and end walls of this chamber are made large enough so that the filter provided thereby has a large enough filtering capacity to permit the air to filter therethru with a minimum resistance to the air. In this way the fan is kept at its normal speed and delivers filtered air in substantially the same quantity as it would deliver unfiltered air. The walls of the air chamber provided by the filtering material also absorb the fan noises and thus quiet the operation of the fan.

Figure 2:
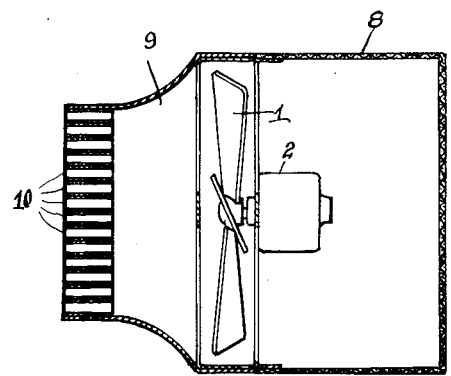
Figure 2 is a side elevation of a fan equipped with a filter and noise silencing outlet in accordance with my invention, the filter and outlet being shown in section.

In Figure 2 I have illustrated the fan with the air chamber provided by a filter housing 8 located at the rear or intake side of the fan. This housing extends from the rear of the cage 4 surrounding the fan 1 so that all air to be delivered by the fan passes thru the filtering housing 8 before it is discharged into another air chamber 9 at the front or delivery side of the fan. This second chamber is made up of suitable imperforate material and the end is preferably reduced in size with a plurality of noise reducing tubes 10, 10 leading therefrom to provide for the discharge of the air from the air chamber 9. It has been found that the use of a plurality of small tubes having a length of approximately six and one-half times their diameter effectively silences noise carried by the air on its passage thru these tubes. This feature, coupled with the use of an air chamber at the intake and discharge side of the fan, efficiently absorbs and silences any noises created by the fan in delivering air and makes the operation of the fan practically noiseless.

Figure 3:
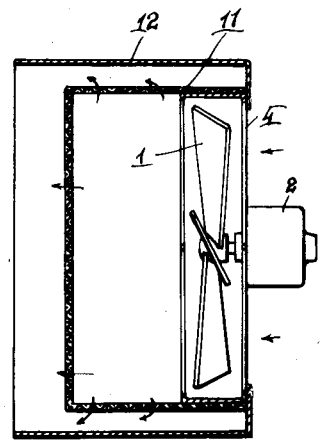
Figure 3 is a side elevation of a fan equipped with a modified form of filter in accordance with my invention.

In Figure 3 I have illustrated another modified form of the combined fan and filter embodying my invention. In this modified form the filter housing 11, which is carried by and extends forwardly of the fan cage 4, is surrounded by an imperforate housing 12 so as to cause all of the air passing thru the filtering housing to be directed forwardly thereof.

Figure 4:
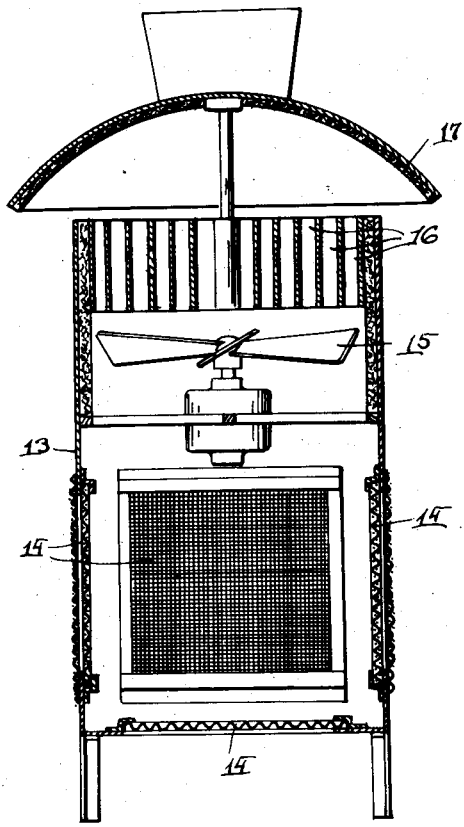
Figure 4 is a vertical sectional view of a cabinet unit embodying my invention of a fan equipped with a filter and noise silencing means.

In the modified form of my invention illustrated in Figure 4 the filter, fan and silencer are incorporated in a cabinet 13 which is adapted to be set up anywhere on the floor of a room. In this way one or more of these units may be set up at the most advantageous point in the room for the ventilation and creation of air currents in the room. In this unit the filter panels 14, 14 are removably arranged in the side walls and the bottom of the cabinet and are protected by a suitable screen which covers the openings in the cabinet as illustrated in Figure 5.

The fan 15 is suitably mounted in the cabinet above the filtering units so as to force the filtered air out thru the silencing tubes 16 at the top thereof.

Over the top of the cabinet is placed the shield 17 so as to deflect the air downwardly around the outside of the cabinet and distribute it over a large area in the room. The inside of the upper portion of the cabinet thru which the air is forced by the fan, as well as the under side of the shield 17, is covered with a sound absorbing material to help in silencing all fan and air noises created by the unit. In this way the combined air filtering and circulating unit may be placed at any convenient point in a room to pick up the air for re-circulation in the room and filtration thereof before it is circulated, and accomplish this in a substantially noiseless manner.

Figure 5:
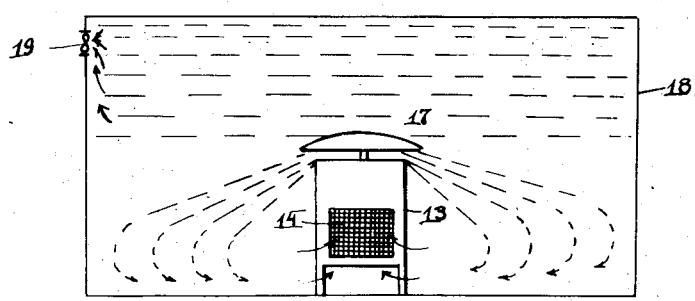
Figure 5 is a diagrammatic view of a room provided with one of the cabinet fans illustrating the distribution of the air by the fan within the room.

In Figure 5 I have illustrated the use of the combined air cooling and filtering unit in a room 18. As shown in this figure the unit extends but partway to the ceiling so as to efficiently circulate and filter the air around the persons occupying the room. In this way the cooling effect of the moving air is most effective where it is needed and any moisture in the air is absorbed by the substantially stationary layer of hot air located between the cooling and filtering unit and the ceiling of the room which may be carried off by a suitable fan 19 in the wall or ceiling of the room.

I claim:

1. Means for absorbing the noises carried by air under pressure which comprises a casing forming an air chamber, an inlet and an outlet for said casing and a plurality of silencing tubes having a length substantially six and one-half times their diameter located within said air chamber to provide unrestricted passage of air therethrough.

2. Means for absorbing the noises carried by air under pressure as set forth in claim 1 in which the silencing tubes have a length that is a multiple in length of a tube having a length substantially six and one half times its diameter.

LEWIS L. DOLLINGER.